March 21, 1961  SVEN-OLOF LUNDGREN  2,975,625
APPARATUS FOR WASHING WOOL
Filed April 2, 1956  2 Sheets-Sheet 1
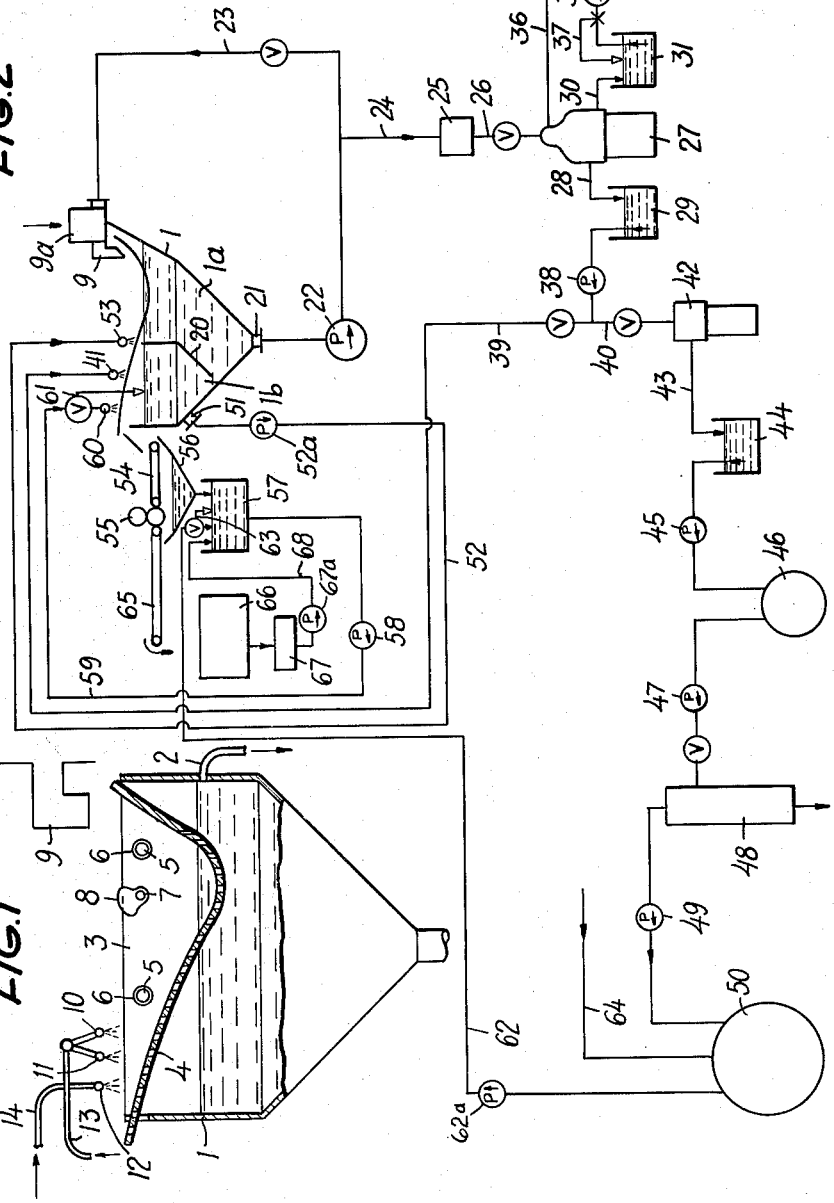
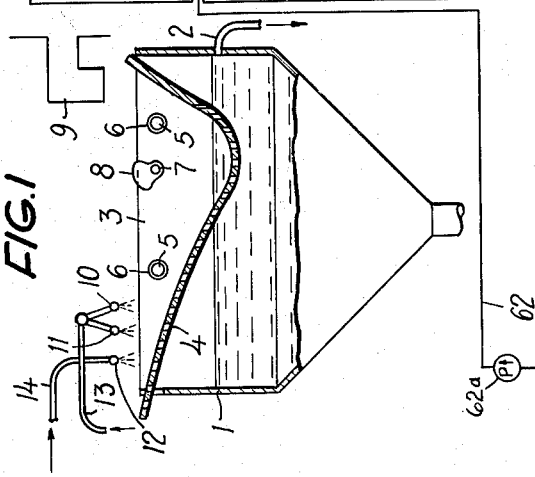

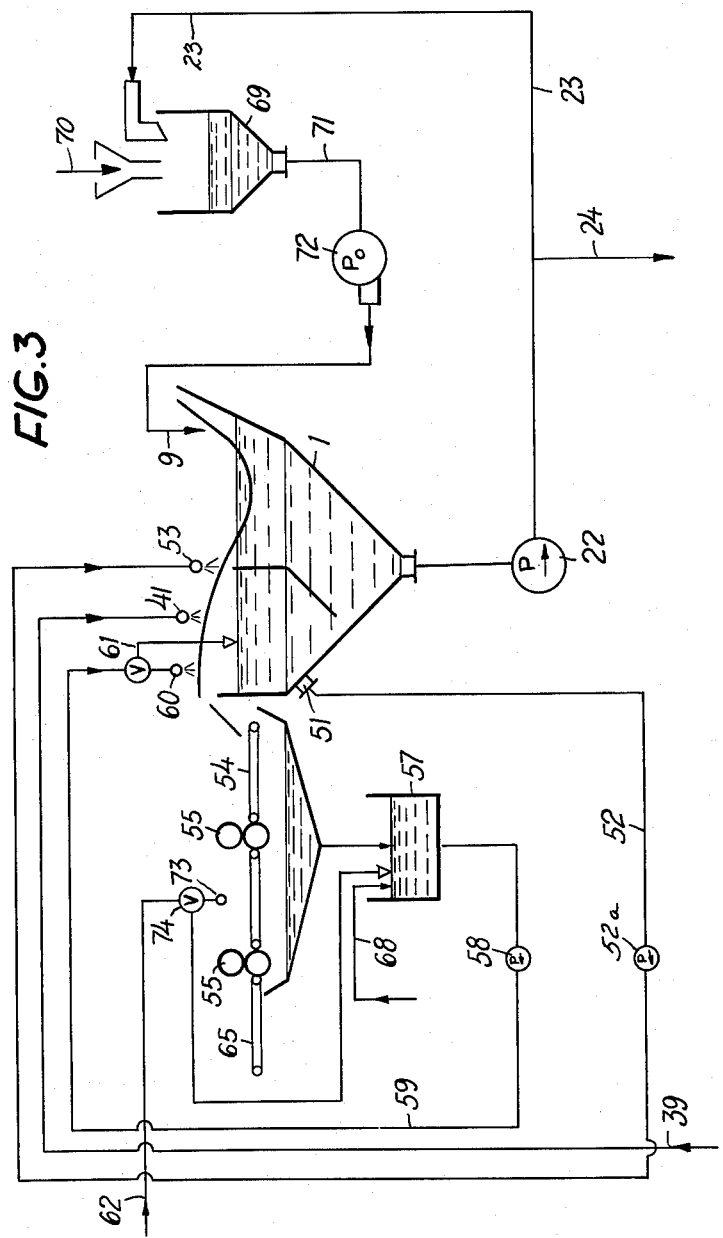

United States Patent Office 2,975,625
Patented Mar. 21, 1961

2,975,625

APPARATUS FOR WASHING WOOL

Sven-Olof Lundgren, Norrkoping, Sweden, assignor to Stiftelsen Svensk Textilforskning, Stockholm, Sweden, a corporation of Sweden Filed Apr. 2, 1956, Ser. No. 575,439

Claims priority, application Sweden Apr. 5, 1955

6 Claims. (Cl. 68—18)

In the purification of raw wool, for example, a number of factors having an influence on the quality of the purified wool have to be considered. Thus the felting tendency of the wool favors the avoidance of the employment of water in the purification process, certain organic washing liquors having been resorted to instead. The English Patent 668,467 is directed to the use of certain types of mineral oils as a washing liquid, whereby said felting is eliminated, while the washing method may be carried into effect at the same time without the observance of any particularly severe restrictions with respect to fire-risks, sanitary drawbacks and the like.

However, it is not only the washing agent which is of importance, this being also the case with the mechanical washing method. In the treatment of the wool, it is of importance to subject the same to procedures as gentle as possible, in order not to run the risk of tearing fibres in two or of an unnecessary entanglement of the fibres, as in the latter case the subsequent carding is rendered difficult.

The present invention primarily refers to an apparatus for washing wool, particularly raw wool, wherein the fibres are subjected to an exceedingly gentle treatment in spite of the fact that the washing is very effective. The apparatus according to the invention is substantially characterized in that the wool is placed on a perforated vibrating bed or support and is caused to move underneath one or more series of sprinkling nozzles for washing liquid, which latter is pumped continuously around from a container arranged underneath the bed and to a contrivance for the supply of wool, which is fed down onto the perforated bed together with the washing liquid, besides which liquid is continuously drawn off from the circulation system, such liquid being purified and returned to one of the series of nozzles.

The invention will be described more closely in the following with reference to the accompanying drawings, wherein Fig. 1 shows a section through a washing apparatus adapted for carrying the method into effect, while Figs. 2 and 3 diagrammatically illustrate a complete plant for the washing of raw wool and a modified embodiment of a portion of such a plant, respectively.

The apparatus shown in Fig. 1 comprises a tub or tank 1, which is provided with an outlet 2 for processing liquid, which is in this case conceived of as consisting of a mineral oil, such as kerosene. Lowered into the tub 1 is a vessel 3, which is provided with a perforated bottom 4 constituting the aforesaid bed. The lower portion of the vessel 3 is submerged into the processing liquid in the tub 1.

The vessel 3 is suspended on rods 5 extending transversely over the tub 1 and passing through the side walls of the vessel, where they are enclosed by rubber sleeves 6 permitting a certain movement of the vessel relatively to the rods 5. Arranged on a shaft 7 extending between the side walls of said vessel is a pulley, not shown herein, and a diagrammatically indicated eccentric weight 8, which when rotating imparts a vibratory movement to the vessel 3.

Provided above one end of the vessel 3 is an inlet 9 for raw wool, which is preferably supplied suspended in processing liquid. The direction of rotation of the shaft 7 is such that the wool is caused by the vibrations to move along the perforated bottom 4 from the right to the left in Fig. 1. Herein, the wool has first passed through the processing liquid at the bottom of the vessel 3, and is then gently caught by the vibrating bottom 4. During its movement over the bottom 4 the wool passes beneath three series of nozzles 10, 11 and 12, through which the processing liquid is sprayed, the liquid ejected through nozzles 10 and 11 being of a purification degree lower than that of the processing liquid ejected through the series of nozzles 12. The processing liquid, which is more contaminated, is supplied to nozzles 10 and 11 through a conduit 13, whereas the purer processing liquid is supplied through a pipe 14. Before the wool reaches the upper left edge of the bottom 4, it will thus have been subjected to washing, by reason of which it is purer than corresponding to the degree of purity of the processing liquid in the tub 1 or to the degree of purity of the liquid ejected through the series of nozzles 10 and 11.

The series of nozzles 10, 11, 12 have been shown in the drawings in the form of perforated pipes.

Fig. 2 diagrammatically shows a complete plant for the purification of raw wool. In this figure are also to be found the tub or container 1, the vibrating bed 4 arranged above the tub, and the inlet 9 for wool suspended in processing liquid. As will appear from the figure, the container 1 is in this embodiment divided into two compartments or parts 1a and 1b by means of a partition 20 projecting down into the container and extending substantially from the lower side of the bed 4 down to the proximity of the bottom of the container, which is formed as a funnel. From the container 1, an outlet 21 located at the lowest point of the bottom and in the part 1a conveys the drawn-off liquid via a pump 22 and a conduit 23 to a contrivance 9a, into which wool to be purified is fed down and suspended in the processing liquid, in order then to be discharged onto the bed 4 through the inlet 9. From the circulation system thus formed, liquid is drawn off through a branch conduit 24 from the conduit 23 for the purpose of being purified.

The conduit 24 leads to a strainer device 25, in which coarse silt and any entrained wool fibres are separated. Through a conduit 26, the liquid is conveyed further to a centrifugal separator 27, from which purified liquid escapes through a conduit 28 to a collecting vessel 29, whereas slimy impure liquid is transferred through a conduit 30 to a collecting vessel 31. From the latter vessel 31, the liquid is pumped by means of a pump 32 through a conduit 33 to a further strainer device 34, wherein the comparatively highly impure liquid is purified, so that slime will escape through a conduit 35, whereas liquid in a more purified state is returned through a conduit 36 to the centrifugal separator 27, which latter is constructed as a nozzle separator. For the vessel 31 there is provided a schematically indicated level regulator 37.

The relatively pure oil contained in the container 29 is conveyed by a pump 38 into two conduits 39 and 40. Of these conduits the conduit 39 leads up to a nozzle series 41 above the part 1b of the tub 1, while the conduit 40 leads to a centrifugal separator 42 for fine-separation of the liquid. Through a conduit 43, the liquid from the centrifugal separator 42 is transferred to a collecting vessel 44 and from the latter via a pump 45 to a supply tank 46 for finely separated liquid. From the supply tank 46, the liquid is pumped by pump 47 to a distillation column 48 for the separation of wool grease dissolved in the liquid, and the purified liquid is pumped by a pump 49 to a supply tank 50.

Provided in the part 1b of the container 1 is an outlet 51 located at a relatively high level in the container, from which outlet the liquid is drawn off and pumped, by pump 52a, around through a conduit 52 to a series of nozzles 53 above the part 1b. The series of nozzles 53 supplies liquid with a higher content of impurities than does the series of nozzles 41, for which reason the series of nozzles 53 is located before the series 41, counted in the direction of movement of the wool.

The wool discharged from the vibrating perforated bed 4 falls down to a conveyor belt 54, which conveys the wool onto a pair of pressing rollers 55, the liquid removed from the wool being then received by a funnel 56 to be permitted to flow down into a vessel 57 containing relatively pure oil. From the vessel 57, the liquid is pumped by a pump 58 through a conduit 59 to a series of nozzles 60, which are located near the discharge end of the perforated bed 4 and thus after the series 53 and 41, counted in the feeding direction of the wool.

Provided in the container 1 is a schematically indicated level regulator 61 admitting liquid through the nozzle series 60 to such an extent that the liquid level in view is maintained. By reason of this, additional liquid will have to be supplied to the container 57, and this liquid is supplied through a conduit 62, by means of pump 62a, from the supply tank 50 for pure oil. The container 57 also has a level regulator 63 provided therein, which controls the supply of liquid through the conduit 62. To compensate for the losses of oil, pure liquid must be supplied to the system, and this pure liquid is conveyed to the supply tank 50 through a conduit 64.

After the wool has passed through the pressing rollers 55, it is conveyed by a belt conveyor 65 to a centrifuge 66, wherein remaining liquid is removed as far as possible, and this liquid is received in a vessel 67, and hence it is pumped, by pump 67a back through a conduit 68 to the container 57 underneath the pressing rollers 55.

Of the pumps comprised in the plant according to Fig. 2, the pump 22 has the incomparably largest capacity and provides for a thorough washing of the wool in connection with the feeding of the latter into the contrivance 9a and the discharge thereof through the inlet 9. In a plant for the washing of 500 kg. of raw wool per hour, for example, the pump 22 may thus have a capacity of 60 cubic meters per hour. 10 cubic meters per hour may be drawn off through the conduit 24, the pump 38 being substantially of this capacity. 500 liters per hour may be conceived of as passing through the pump 49.

The capacity of the pump 52a inserted into the conduit 52 may be 10 cubic meters per hour, whereas the capacity of the pump 58 is preferably approximately 1800 liters per hour.

The system described may obviously be varied in different ways. Thus it will be possible to use the relatively pure oil coming from the fine separator 42 and to convey such oil to the container 57 through the provision of a supply conduit, preferably controlled by a valve, for instance between said container and the pump 45. It is also possible to arrange a conduit between the strainer 25 and the container 31 in the recirculation system for the coarse separator 27.

Fig. 3 shows a modified construction of the plant according to Fig. 2. In this case, the conduit 23 opens into a mixing vessel 69, into which wool is also fed down, as indicated by the arrow 70. The wool suspended in the liquid then follows the latter through a conduit 71 and is caused to pass through a pump 72, which is preferably of the centrifugal type, and the suspension is then transferred to the container 1 through the inlet 9 located thereabove. During its passage through the pump 72, a very powerful stirring effect is imparted to the mixture, such stirring effect having a favourable influence on the purifying process.

The plant according to Fig. 3 also differs from that previously described by the provision of two pairs of pressing rollers 55, between which pure washing liquid is supplied to the wool through the conduit 62 and ejecting nozzles 73. Hereby a still higher degree of purity is imparted to the wool, which is finally discharged through the second pair of pressing rollers 55. Before the nozzles 73 there is arranged a valve 74, which is controlled by a level regulator provided in the container 57, in the same manner as in the construction according to Fig. 2.

In most cases, it is believed to be sufficient to provide a single processing step, but if desired, one may obviously arrange a plurality of processing tubs 1 in series behind one another, the plant having then obviously to be modified in adaptation to the construction selected.

Inasmuch as the two parts 1a and 1b of the container 1 communicate with each other through the space between the bottom edge of partition 20 and the sloping wall of vessel 1 and liquid is continuously being removed from the part 1a, liquid will flow from the part 1b to the part 1a. The communication between the two parts is located at the bottom of the part 1b, for which reason heavy impurities will also be removed from the same.

Through the vibrations of the perforated bottom 4, rapid currents of continuously changing directions will arise between the wool fibres, whereby the washing effect will be extremely good. Furthermore, it should be understood that the wool is not subjected to any appreciable mechanical strains.

The invention is not limited to the form of embodiment above described. Thus the bed may be constituted by a perforated belt conveyor, which is subjected to vibrations at right angles to the belt surface. If desired, vibrating members may be arranged underneath the bed, such members bringing about a relative movement between the wool and the liquid, preferably and substantially at right angles to the bed.

What I claim is:

1. A wool washing apparatus, comprising a tank adapted to contain a body of washing liquid, a perforated bed having an entrance portion adjacent one side of said tank, a middle portion, and an exit portion adjacent an opposite side of said tank, means resiliently supporting said bed in said tank with at least the middle portion of said bed normally submerged in such body, means for feeding a suspension of wool in washing liquid onto said bed at the entrance portion of the latter, means for vibrating said bed in such manner as to move wool in one direction therealong from said entrance portion to said exit portion thereof, a plurality of series of spray nozzles, said series of spray nozzles being disposed sequentially above and over the exit portion of said bed and adapted to spray washing liquid onto wool being moved along the latter, means for supplying relatively impure washing liquid from a first source to the sequentially first series of spray nozzles and means for supplying purer washing liquid from a second source to the sequentially last series of spray nozzles.

2. The apparatus defined in claim 1, in which the lower portion of said tank has sides which slope inwardly to an apex outlet at the bottommost part of the tank and in which a partition is disposed within said tank and with its upper edge beneath and intermediate the ends of said bed, the lower edge of said partition terminating at a distance from that sloping side of said tank furthermost removed from said entrance portion of said bed, said partition dividing the interior of the tank into a sequentially first space which includes said apex outlet and a sequentially second space, said first and second spaces communicating with each other under the lower edge of said partition.

3. The apparatus defined in claim 2, in which in that sloping wall of said tank which is contiguous with said second space there is provided, intermediate the top of the tank and the level of the lower edge of said partition, an opening constituting a second outlet, and in which said sequentially first supplying means is in communication with the interior of said second space by way of said second space outlet.

4. A wool washing apparatus, comprising a tank adapted to contain a body of washing liquid, a perforated bed having an entrance portion adjacent one side of said tank, a middle portion, and an exit portion adjacent an opposite side of said tank, means resiliently supporting said bed in said tank with at least the middle portion of said bed normally submerged in such body, means for feeding a suspension of wool in washing liquid onto said bed at the entrance portion of the latter, means for vibrating said bed in such manner as to move wool in one direction therealong from said entrance portion to said exit portion thereof, a plurality of series of spray nozzles, said series of spray nozzles being disposed sequentially above and over the exit portion of said bed and adapted to spray washing liquid onto wool being moved along the latter, means for supplying relatively impure washing liquid from a first source to the sequentially first series of spray nozzles, means for supplying relatively pure washing liquid from a second source to the sequentially last series of spray nozzles, at least one pressing means adjacent the exit portion of said bed, means for transporting wool from the exit portion of said bed to said pressing means, a vessel beneath said pressing means for containing washing liquid squeezed from wool passing through said pressing means and means communicating between said vessel and said sequentially last series of spray nozzles for supplying washing liquid to said spray nozzles.

5. A wool washing apparatus, comprising a tank adapted to contain a body of washing liquid, a perforated bed having an entrance portion adjacent one side of said tank, a middle portion, and an exit portion adjacent an opposite side of said tank, means resiliently supporting said bed in said tank with at least the middle portion of said bed normally submerged in such body, means for feeding a suspension of wool in washing liquid onto said bed at the entrance portion of the latter, means for vibrating said bed in such manner as to move wool in one direction therealong from said entrance portion to said exit portion thereof, a plurality of series of spray nozzles, said series of spray nozzles being disposed sequentially above and over the exit portion of said bed and adapted to spray washing liquid onto wool being moved along the latter, means for supplying relatively impure washing liquid from a first source to the sequentially first series of spray nozzles, means for supplying relatively pure washing liquid from a second source to the sequentially last series of spray nozzles, means for suspending wool in said washing liquid, said tank having an outlet, means for passing washing liquid from said outlet to said suspending means, and means for passing a suspension of wool in washing liquid from said suspending means to said feeding means.

6. The apparatus defined in claim 1, in which there are included means for purifying impure washing liquid, means for passing impure washing liquid from the lowermost part of said tank to said purifying means, and means for supplying to one of said series of spray nozzles washing liquid from said purifying means.

References Cited in the file of this patent

UNITED STATES PATENTS

| | | |
|---|---|---|
| 251,833 | Clough | Jan. 3, 1882 |
| 410,312 | Church | Sept. 3, 1889 |
| 889,924 | Hamilton | June 9, 1908 |
| 1,125,691 | Just | Jan. 19, 1915 |
| 1,652,649 | Tice | Dec. 13, 1927 |
| 1,978,536 | Jeavons | Oct. 30, 1934 |
| 2,665,189 | Cox | Jan. 5, 1954 |
| 2,724,955 | Spooner | Nov. 29, 1955 |
| 2,737,435 | Borck | Mar. 6, 1956 |
| 2,773,375 | Cox | Dec. 11, 1956 |
| 2,776,558 | Vang | Jan. 8, 1957 |

FOREIGN PATENTS

| | | |
|---|---|---|
| 372,576 | Great Britain | May 12, 1932 |